United States Patent [19]
Coffing

[11] Patent Number: 4,490,259
[45] Date of Patent: Dec. 25, 1984

[54] FLOTATION APPARATUS AND PROCESS UTILIZING A NOVEL MIXING AND FLOC DISPERSION MEANS

[75] Inventor: Samuel F. Coffing, Miami, Fla.

[73] Assignee: International Resources Management, Inc., Coral Gables, Fla.

[21] Appl. No.: 428,776

[22] Filed: Sep. 30, 1982

[51] Int. Cl.³ ............................................... C02F 1/24
[52] U.S. Cl. .................................. 210/704; 210/221.2
[58] Field of Search ............................. 210/703–707, 210/221.1, 221.2

[56] References Cited

U.S. PATENT DOCUMENTS

| | | | |
|---|---|---|---|
| 2,190,634 | 2/1940 | Leone et al. | 225/3 |
| 2,343,560 | 3/1944 | Klein et al. | 138/27 |
| 2,790,463 | 3/1956 | Delano et al. | 138/44 |
| 2,793,185 | 5/1957 | Albrektsson | 210/44 |
| 2,938,629 | 5/1960 | Hollingsworth | 209/170 |
| 3,043,433 | 7/1962 | Singer | 210/197 |
| 3,084,718 | 4/1963 | Ash | 138/40 |
| 3,111,091 | 11/1963 | Hopkinson | 103/262 |
| 3,128,993 | 4/1964 | Platte et al. | 259/4 |
| 3,301,779 | 1/1967 | Kovacs | 210/705 |
| 3,418,236 | 12/1968 | Mail | 210/44 |
| 3,446,353 | 5/1969 | Davis | 209/164 |
| 3,446,488 | 5/1969 | Mail et al. | 261/77 |
| 3,628,775 | 12/1971 | McConnell | 210/220 X |
| 3,809,240 | 5/1974 | Savall | 210/221 |
| 3,929,640 | 12/1975 | Dohnert | 210/195 |
| 3,934,614 | 1/1976 | Elek et al. | 138/44 |
| 3,959,131 | 5/1976 | Ramirez et al. | 210/221 |
| 3,996,025 | 12/1976 | Gulden | 48/107 |
| 4,071,447 | 1/1978 | Ramirez | 210/221 X |
| 4,108,768 | 8/1978 | Sebelik et al. | 210/705 |
| 4,138,330 | 2/1979 | Garrett | 210/205 X |
| 4,186,087 | 1/1980 | Kato | 210/221 X |
| 4,271,027 | 6/1981 | Kelly | 210/703 X |

FOREIGN PATENT DOCUMENTS 52-48268 4/1977 Japan .
457149 11/1936 United Kingdom .

Primary Examiner—Thomas Wyse
Attorney, Agent, or Firm—Robbins & Laramie

[57] ABSTRACT

This invention generally relates to an improved flotation apparatus and process for purifying a stream of effluent by forming a separable, buoyant floc out of the waste matter suspended in the effluent. The improved apparatus and process utilizes a mixing and floc dispersion means for intimately admixing the stream of effluent with a conditioning agent in a stream of tiny gas bubbles. The mixing and floc dispersion means also functions to dampen floc-sinking currents which are generated by the introduction of the stream of effluent into the flotation tank, and to uniformly disperse the resulting floc across the width of the tank. The mixing and floc dispersion means includes a series of at least two elongated, fluidly connected chambers, wherein the second chamber has a larger cross-sectional area than the first chamber.

21 Claims, 4 Drawing Figures

FLOTATION APPARATUS AND PROCESS UTILIZING A NOVEL MIXING AND FLOC DISPERSION MEANS

BACKGROUND OF THE INVENTION

1. Field of the Invention

The present invention generally relates to an improved flotation apparatus and process for purifying a waste effluent by forming a separable, buoyant floc out of the waste matter suspended in the effluent. The invention utilizes a novel mixing and floc dispersion means to achieve an improved flotation apparatus and process.

2. Description of the Prior Art

The purification of waste effluents by flotation devices is well known in the prior art. In general, such devices purify effluents such as waste water by forming a buoyant floc out of the particles suspended in the water. The buoyant floc rises to the surface of the water, where it is skimmed off by an arrangement of skimming paddles.

More specifically, the stream of effluent to be treated is first mixed with one or more conditioning agents and then conducted into a flotation tank, where the effluent and flocculating agent is mixed with a stream or cloud of small bubbles of buoyant gas. The conditioning agent may either be a precipitating agent, a coagulating agent, a flocculating agent, or may function to change the pH of the effluent. In any event, the conditioning agent causes the particles of waste matter suspended in the effluent to flocculate into agglomerates of ever-increasing size. Since this flocculating process is carried out in the presence of the stream or cloud of tiny, buoyant bubbles produced in the flotation tank, some of these bubbles become entrapped in the growing agglomerates of flock. The entrapped bubbles of buoyant gas accordingly render the agglomerates of floc buoyant, and cause them to float up to the surface of the flotation tank. The skimming mechanism rakes the buoyant floc over to a floc accumulation region of the flotation tank, where the skimming paddles ultimately rake the floc out of the tank. The treated effluent is then discharged from the treatment tank.

Ideally, a flotation device should be capable of effectively purifying a large volume of effluent in as short a time and as small a volume as possible in order to minimize the expenses associated with both the construction and the space requirements of the device.

To this end, the flotation device should have a mixing means capable of quickly and effectively admixing the streams of effluent, conditioning agent and bubbles to form a buoyant floc out of the waste particles suspended in the effluent. Moreover, the flotation device should have a means for uniformly distributing the resulting buoyant floc over transverse axis of the floc accumulation area of the treatment tank so that the floc may be easily and effectively skimmed off the fluid surface. Further, the flotation device should have a means for dampening fluid currents in the tank which could agitate the bubbles out of the floc floating on the surface of the fluid, thereby causing it to sink to the tank bottom. Such floc sinking currents tend to arise when large streams of effluent are introduced into a relatively small tank. The resulting sunken floc not only thwarts the effectiveness of the skim removal means, but often necessitates either the addition of a tank floor-sweeping mechanism, or frequent use of troublesome and time-consuming tank maintenance procedures. Finally, it would be desirable if the flotation device accomplished all of the aforementioned functions with a means which required little or no maintenance.

Unfortunately, the prior art does not disclose a flotation apparatus having a means which achieves all of the aforementioned ideal criteria. For example, while there is some recognition in U.S. Pat. No. 3,679,056 of the desirability of efficiently admixing the stream of effluent with a stream of buoyant gas bubbles, the mixing chamber of this device includes a gas capturing lip which can impede the flow of buoyant floc from the bottom to the top of the tank. Such an obstruction could shake the buoyant gas bubbles out of the flock, causing it to sink to the bottom. An additional drawback in the design is the lack of any apparent means for uniformly distributing the buoyant gas bubbles across the transverse axis of the tank. Hence, this design could generate a non-uniform layer of floc across the surface of the effluent in the tank, with buoyant floc collecting more densely at the middle of the tank than the sides of the tank. Additionally, this design has no apparent means to dampen floc-sinking currents which could be generated from the inflow of fluid from the feed inlet. The combination of these apparent deficiencies may account for the inclusion of a sludge raking means in this design.

U.S. Pat. Nos. 3,418,236 and 3,446,488 also disclose flotation devices for purifying a stream of effluent. However, like the previously discussed U.S. Pat. No. 3,679,056, neither of the devices disclosed in these patents has any apparent means to effectively dampen floc-sinking currents caused by the inflow of effluent. Additionally, while U.S. Pat. No. 3,418,236 discusses the desirability of admixing the stream of buoyant gas bubbles with the effluent being treated, both of these patents disclose the use of a mixing body or baffle to achieve these ends. The inventor has found, in the course of empirical experimentation, that such mixing baffles tend to accumulate deposits of agglomerating floc. If such mixing baffles are not regularly cleaned, the surface of the mixing baffles becomes irregular, generating localized turbulences which not only result in a non-uniform dispersion of floc, but which also agitate the buoyant bubbles out of some of the floc passing over the surface of the mixing baffle, causing it to sink and accumulate into the bottom of the tank.

The flotation apparatus disclosed in U.S. Pat. No. 3,929,640 also discloses a design which falls short of fulfilling the aforementioned ideal criteria. The invention in the U.S. Pat. No. 3,929,640 discloses a mixing and flow mechanism which includes a horizontal, disk-like baffle. As stated before, such baffles tend to accumulate deposits of floc, which in turn adversely affects the formation of a uniform layer of buoyant floc on the surface of the tank, while generating non-buoyant floc which accumulates on the bottom of the treatment tank.

Clearly, all of the foregoing prior art designs include features such as mixing baffles which cause them to fall short of fulfilling all of the aforementioned ideal criteria of a simple and compact flotation apparatus capable of effectively purifying a large volume of effluent in a short time.

SUMMARY OF THE INVENTION

The invention relates to an improved flotation apparatus and process capable of effectively admixing a stream of effluent and conditioning agent with a stream of bubbles and uniformly distributing the resulting buoyant floc across the width of a flotation tank while dampening floc-sinking currents caused by the inflow of an effluent stream into the tank. The improved flotation apparatus and process both utilize an inlet means for introducing a stream of effluent and conditioning agent of cross-sectional area A into a treatment tank, and a mixing and floc dispersion means for intimately mixing the stream of effluent and conditioning agent with a stream of bubbles. The mixing and floc dispersion means includes a series of elongated and fluidly connected chambers of expanding size. The series of chambers includes at least first and second chambers having cross-sectional areas along their longitudinal axes of average values X and Y, respectively, wherein A is less than X, and X is less than Y. The mixing and floc dispersion means of the invention further includes an inlet port defined in the free end of the first chamber for receiving the stream of effluent, conditioning agent and bubbles, as well as an outlet port defined in the free end of the last chamber of the series which is in fluid communication with the effluent being treated in the treatment tank.

The mixing and floc dispersion means may be vertically oriented in the treatment tank, and completely submerged in the effluent being treated in the tank. Further, the outlet port present in the last chamber of the mixing and floc dispersion means may be circumscribed by a wall which defines a progressively expanding cross-sectional area which assists the device in uniformly dispersing the buoyant floc across the width of a floc accumulation region of the tank. The mixing and floc dispersion means may include a bubble stream guide for guiding and concentrating the stream of gas bubbles generated by a bubble generator into the inlet port present in the first chamber.

Finally, the cross-sectional area of the inlet port of the mixing and floc dispersion means may be about twice the area A of the stream of effluent and conditioning agent introduced into the tank, if the diameter of the stream of effluent is about one inch or less.

DESCRIPTION OF THE SEVERAL FIGURES

DETAILED DESCRIPTION OF THE PREFERRED EMBODIMENT

Figure 1:
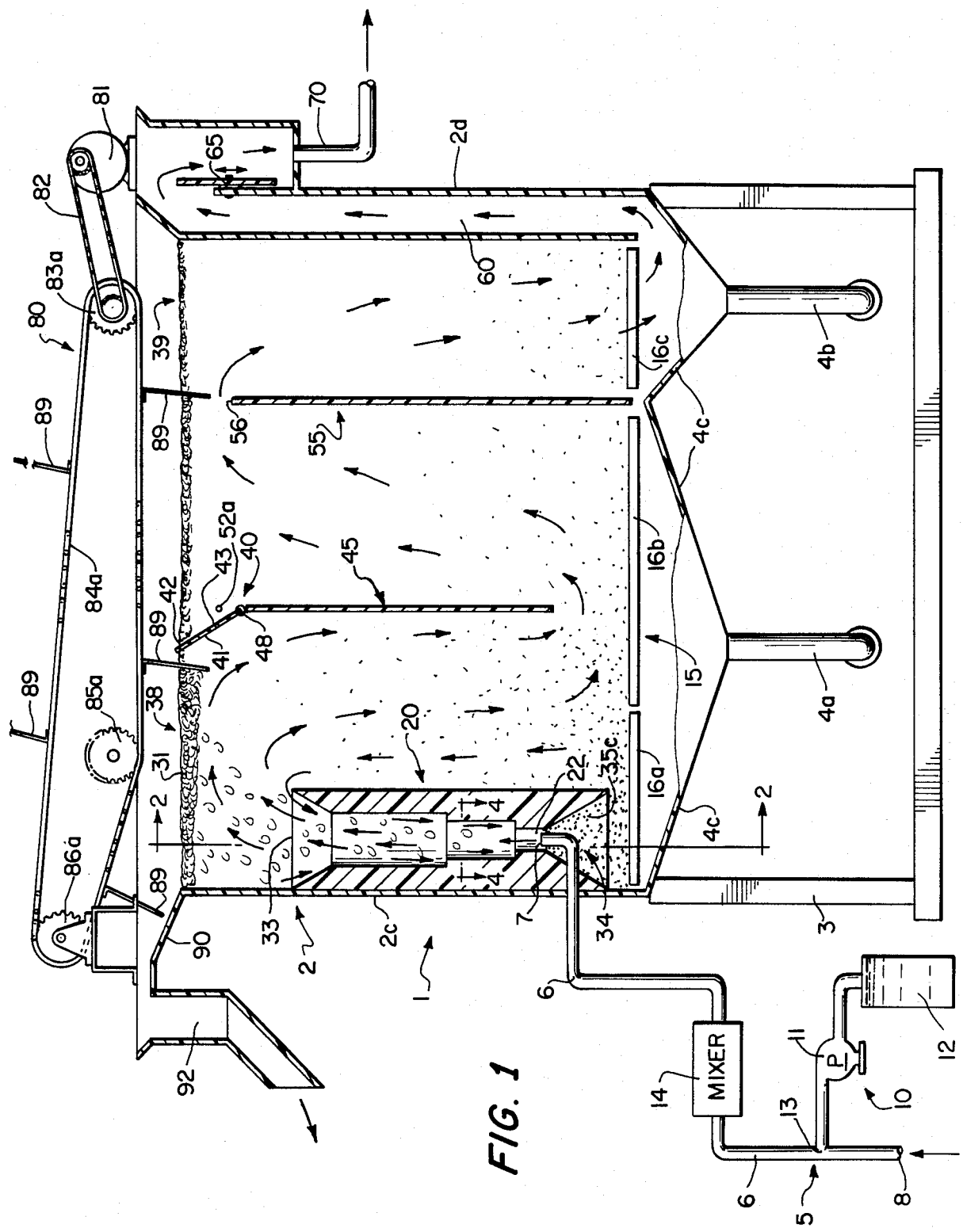
FIG. 1 is a cross-sectional view of the improved flotation tank of the invention.

With reference now to FIG. 1, the preferred embodiment of the flotation apparatus 1 of the invention generally comprises a treatment tank 2 mounted on a frame 3. Treatment tank 2 includes an inlet means 5 for introducing a stream of effluent into the treatment tank 2, a conditioning agent supply means 10 for supplying a stream of at least one conditioning agent to the stream of effluent, a bubble generator 15 including electrode groups 16a, 16b and 16c for introducing a stream of buoyant gas bubbles into the stream of effluent, and a mixing and floc dispersion means 20. Treatment tank 2 also includes a pair of cleaning drains 4a and 4b for draining the tank and flushing out any non-buoyant floc which might accumulate on the tank floor 4c. Additionally, the various portions of tank floor 4c are inclined toward the drains 4a and 4b, to facilitate the tank flushing procedure. While the walls 2a, 2b, 2c and 2d and floor 4c of the tank 2 may be made from almost any type of material, plastic or fiberglass is preferred due to the natural corrosion resistant properties of such materials. Finally, treatment tank 2 includes a floc accumulation region 38 which is located above the mixing and floc dispersion means 20, and an outlet region 39 which is located in the vicinity of outlet channel 60.

The effluent inlet means 5 includes a conduit 6 having a mouth 7 of cross-sectional area A for introducing a stream of effluent and flocculating agent of cross-sectional area A into the inlet port 22 of the mixing and floc dispersion means 20. A conditioning agent supply means 10 supplies a stream of at least one conditioning agent to untreated effluent flowing into the inlet 8 of inlet conduit 6. Conditioning agent supply means 10 includes at least one conditioning agent pump 11 for pumping a conditioning agent from a reservoir 12 directly into conduit 6 at junction 13. If more than one type of conditioning agent is used, a separate pump for pumping each agent is preferred. Inlet conduit 6 preferably includes an in-line fluid mixer 14 between junction 13 and conduit mouth 7 for intimately admixing the conditioning agent with the stream of effluent before the effluent stream is discharged from conduit mouth 7. Again, if more than one conditioning agent is used, the use of a separate in-line mixer for each such agent is preferred. While the means for introducing and admixing a conditioning agent into the effluent inlet conduit 6 forms no part of the instant invention, it should be noted that intimate premixing of a conditioning agent with the stream of untreated effluent before the effluent is introduced into the treatment tank 2 will enhance the effectiveness of the mixing and floc dispersion means 20 in converting the waste particles suspended in the effluent into a uniform layer of buoyant floc across the width of tank 2.

Bubble generator 15 preferably includes three separate electrode groups 16a, 16b and 16c, for producing a stream or cloud of tiny bubbles of buoyant gas via electrolysis. Although not shown in detail, the orientation and structure of the electrode groups 16a, 16b and 16c is such that streams of bubbles pass through substantially the entire volume of the effluent in the tank 2. An electrolytic means for bubble production is preferred since such methods generally produce smaller bubbles than forced-air methods which are more easily entrapped into the agglomerates of floc, thereby enhancing the efficiency of the invention. Specifically, it is well known that the hydrogen and oxygen bubbles produced by electrolytic methods have diameters typically ranging from 15 to 45 microns, whereas the bubbles produced by forced-air methods having diameters typically ten times greater. However, it should be noted that the exact device or technique utilized in producing small bubbles forms no part of the instant invention, and that this invention may be practiced with small bubbles produced by any technique.

Figure 2:
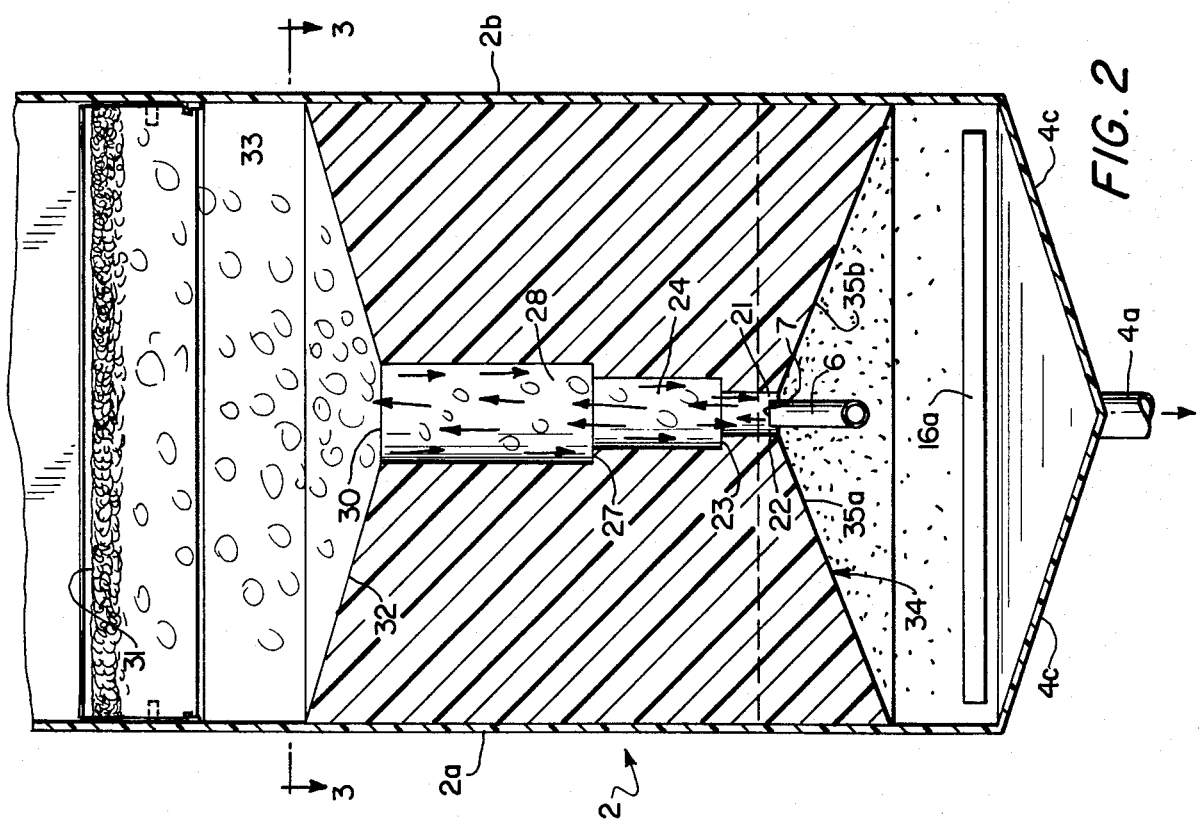
FIG. 2 is a cross-sectional view of the mixing and floc dispersion means of the invention taken along line 2—2 of FIG. 1.

With reference now to FIGS. 1 and 2, the mixing and floc dispersion means 20 of the invention includes a series of at least two, and preferably three, elongated and fluidly connected chambers 21, 24 and 28, respectively. Chamber 21 of the mixing means 20 includes an inlet port 22 for receiving the stream of effluent of cross-sectional area A discharged from inlet conduit mouth 7. In the preferred embodiment, the cross-sectional area of the inlet port 22 is equal to the cross-sectional area X of chamber 21, although such dimensioning is not critical to the functioning of the invention. Each of the chambers 21, 24 and 28 preferably has a cross-sectional area of a constant value throughout its longitudinal axis, although the invention would be operable with chambers formed from shallow, frustro-conical sections whose walls tapered outwardly five or ten degrees from the longitudinal axis. The cross-sectional area of these chambers becomes progressively larger from the first chamber to the last, with the cross-sectional area of the first preferably larger than the cross-sectional area A of the incoming stream of effluent and conditioning agent. Thus, if the cross-sectional area of chambers 21, 24 and 28 is X, Y and Z, respectively, then the cross-sectional area A of the stream of effluent discharged from conduit mouth 7 should be less than X, which in turn is less than Y, which in turn is less than Z. The series of fluidly connected chambers 21, 24 and 28 also preferably becomes longer along their longitudinal axes from the first to the last chambers, as shown. While the cross-sectional shape of the chambers 21, 24 and 28 is preferably circular as shown, other plane figures, such as square, are also operable. The diameters of the chambers 21, 24 and 28 are preferably dimensioned from empirical observation of the inventor of a 60 gallon per hour experimental model such that the diameter of the incoming stream of effluent is ⅝ inches. Then the diameter of chamber 21 is 1 inch, of chamber 24 is 1¼ inches, and of chamber 28 is 2 (cont. 8a).

The junction walls 23 and 27 between the chambers 21, 24 and 28 are preferably ring-shaped walls as illustrated which are orthogonally disposed to the longitudinal axes of the chambers 21, 24 and 28. It is particularly preferable that junction wall 23 between chambers 21 and 24 be such an orthogonally disposed ring-shaped wall, rather than a shallow, frustro-conical wall. Such an orthogonal orientation allows junction wall 23 to act as a floc capturing means for non-buoyant floc which falls down the series of chambers 21, 24 and 28, thereby preventing it from accumulating on the floor 4c of tank 2. However, it should be noted that the invention could function with frustro-conical junction walls between any two of the three chambers.

Figure 3:
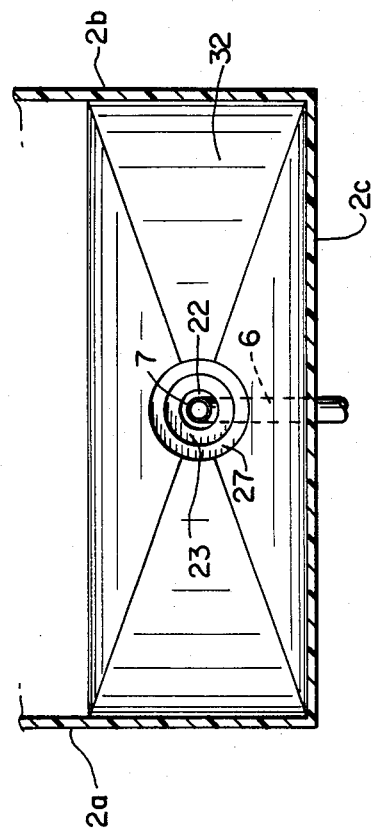
FIG. 3 is a plan elevational view of the mixing and floc dispersion means of the invention.

Mixing means 20 additionally includes an outlet port 30 for discharging both effluent and buoyant floc formed in the chambers 21, 24 and 28. In the preferred embodiment, the cross-sectional area of outlet port 30 is equal to the cross-sectional area of chamber 28. Outlet port 30 is disposed under and fluidly communicates with the surface 31 of the effluent being treated in the tank 2 as illustrated. Outlet port 30 is circumscribed by a wall 32 having a progressively expanding cross-sectional area along the longitudinal axes of the series of chambers 21, 24 and 28. As shown in FIG. 3, wall 32 may be shaped like an inverted pyramid. Wall 32 terminates in a top edge 33. The circumscribing wall 32 assists the mixer 20 to uniformly disperse the buoyant floc it produces along the floc accumulation region 38 of the surface 31 of the effluent being treated in treatment tank 2. The circumscribing wall 32 should be sloped at least thirty degrees from the horizontal at every point; if the wall is sloped less than thirty degrees, its effectiveness in uniformly dispersing the floc is reduced.

Finally, mixing means 20 also includes a pyramidally shaped bubble stream guide 34 having gently inclined walls 35a, 35b, 35c and 35d (of which wall 35d is not shown) for concentrating or focusing the stream of bubbles produced by electrode set 16a around the conduit mouth 7 as shown. Walls 35a, 35b, 35c and 35d should all be inclined at least thirty degrees from the horizontal. If they are inclined less, the bubbles formed by electrode group 16a would tend to coalesce together before entering the inlet port 22 of the chamber 21.

The mixing and floc dispersion device 20 is preferably molded from an inert, electrically non-conductive material such as polyurethane or fiberglass. The mixing means 20 may either be an integrally molded component of mixing tank 2, or it may be separately molded and retrofitted into an existing treatment tank. In any case, the mixing means 20 should be disposed deeply enough toward the bottom of treatment tank 2 so that the top edge 33 of the circumscribing wall 32 is no closer than 25% of the depth of the tank to the surface 31 of the effluent. If the top edge 33 is placed any closer to the surface 31 of the effluent being treated in tank 2, the fluid currents generated by the influx of effluent from conduit mouth 7 might agitate the buoyant floc collecting on surface 31 and shake the bubbles of gas from at least some of it, causing it to fall down and accumulate onto the bottom of the treatment tank 2.

Figure 4:
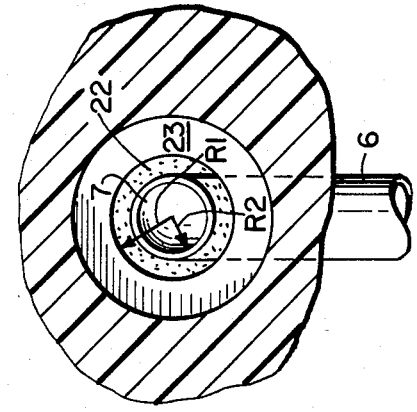
FIG. 4 is a detailed plan, elevational drawing of the inlet pipe and first chamber of the mixing and floc dispersion device of the invention, taken along line 4—4 of FIG. 1.

With specific reference now to FIGS. 3 and 4, the conduit mouth 7 of inlet conduit 6 is preferably circular, and concentrically aligned with the inlet port of chamber 21, which is also preferably circular. If the diameter of conduit mouth 7 is ⅝ inch, then the diameter of the inlet port 22 is 1 inch. The method of scale up to higher volume models of this device is such that the fluid drag is maintained constant in the larger models when compared with the dimensions stated above. This scale up ratio may be determined from a formula for Friction Loss in a Pipe by Williams and Hazen which states that:

$$H = .2083 \frac{100}{C} 1.852 \times \frac{q^{1.852}}{d^{4.8655}}$$

where H is friction head in feet of water/hundred feet of pipe, q is flow (gpm), d is inside diameter of the pipe in inches, and C is the surface roughness constant. Any small variation in these general dimensioning should not render this device materially different.

Referring back to FIG. 1, the improved flotation apparatus 1 also includes floc barrier and current diverting means 40 which has a top wall 41 for preventing the floc from floating from the floc accumulation region 38 to the outlet region 39 of the tank 2. Top wall 41 also includes a lower portion 43 which diverts the fluid currents generated by the mixing means 20 downwardly, thereby preventing these currents from moving the floc in region 38 over to the outlet region 39. Finally, top wall 41 is pivotally mounted inside the tank 2 via pivoting means 48 which may be a pair of opposing sockets in the side walls of tank 2 which receives a pair of opposing ears which extend out from the sides of the lower portion 43 of top wall 41. Top wall 43 is preferably formed from a buoyant plastic material and is dimensioned so that it floats in the inclined position shown in FIG. 1. Finally, floc barrier and current diverting means also includes a bottom wall 45 which assists the top wall 41 in diverting the floc moving currents away from outlet region 39 and toward the bottom of the tank 2. The floc barrier and current diverting means forms no part of the instant invention, but is a separate invention fully disclosed and claimed in patent application Ser. No. 428,773, filed Sept. 30, 1982, and entitled "Improved Flotation Apparatus and Process Utilizing a Novel Floc Barrier and Current Diverting Means" by the inventor, Samuel F. Coffing, the entire drawings and specification of which are expressly incorporated herein by reference. Accordingly, no further description of floc barrier and current diverting means 41 will be given here. Suffice it to say that, in the preferred embodiment, top wall 41 is buoyant and pivotally mounted in treatment tank 2, and it is capable of coacting with the skimming paddles of skimming means 89 so that the floc generated by mixing means 20 is more effectively raked into the floc accumulation area and prevented from straying into the outlet region 39 of the tank 2.

The improved flotation apparatus 1 of the invention also includes another baffle 55 near the outlet region 39 of the tank 2. Baffle 55 guides the effluent over the right side of electrode group 16b to flow in the relatively narrow space between upper baffle lip 56 and skimming paddle 89, thereby making it easier for paddle 89 to rake the buoyant floc which is formed over the right side of electrode group 16b. Baffle 55 also guides the effluent flowing over lip 56 through the polishing or refining electrode group 16c as shown. The flotation apparatus 1 of the invention also includes an outlet channel 60, and an adjustable weir 65 which determines the fluid level in the treatment tank 2. The construction of adjustable weir 65 is conventional and forms no part of the instant invention. The treatment tank 2 also includes an outlet conduit 70 for conducting the treated effluent out of the tank 2.

Finally, the improved flotation apparatus of the invention also includes a skimming means 80 for removing the buoyant floc produced by mixer 20 and the electrode groups 16a, 16b and 16c from the treatment tank. Skimming means 80 generally includes a drive motor 81, which is connected via drive chain 82 to a sprocket and chain assembly including sprockets 83a and 83b, 85a and 85b, and 86a and 86b, which are mechanically engaged via chains 84a and 84b (sprockets 83b, 85b and 86b, and chain 84b are not shown). Skimming paddles 89 are mechanically attached to the pair of drive chains 84a and 84b and function to rake the floc generated by mixer 20 off of the surface 31 of the effluent up a ramp 90 where the floc falls down through an outlet chute 92. Skimming means 80 is conventional in structure and forms no part of the instant invention. Applicant notes that similar skimming means are illustrated in U.S. Pat. Nos. 2,813,074, 3,121,680 and 3,959,131, the entire drawings and specifications of which are expressly incorporated herein by reference.

In operation, a stream of effluent is conducted through inlet conduit 6. Pump 11 injects a conditioning agent into inlet conduit 6 at junction 13 from the conditioning agent reservoir 12. In-line mixer 14 functions to intimately admix the effluent with the conditioning agent. The resulting mixture of effluent and conditioning agent flows out of conduit mouth 7. Conduit mouth 7 is concentrically located in inlet port 22, thereby leaving a ring-shaped area between the outside perimeter of conduit mouth 7 and the inside perimeter of inlet port 22 (see FIG. 4). It is through this ring-shaped area that the stream of bubbles produced by electrode group 16a and focussed by pyramidally shaped bubble guide 34 come into contact with the stream of effluent discharged through conduit mouth 7. The bubble stream surrounding the stream of effluent discharged from conduit mouth 7 is pulled up into the inlet port 22 by both the natural buoyancy of the bubbles and by Bernoulli forces created by the effluent stream.

As the stream of effluent and the stream of bubbles ascends through chambers 21, 24 and 27, the stepwise enlargement of the cross-sectional area of the series of chambers are responsible for the generation of counter-currents which oppose the current of effluent formed by the stream flowing out of conduit mouth 7, as schematically shown in the flow pattern arrows in FIG. 2. These counter-currents perform the two important functions of thoroughly and intimately admixing the small bubbles formed by electrode group 16a with the stream of effluent flowing from conduit mouth 7, while dampening the vertically oriented currents generated by the stream of effluent flowing out of conduit mouth 7. The dampened currents do not agitate the bubbles out of the floc floating on the surface 31 of the treatment tank 2 and cause them to sink to the tank bottom to any great extent. Further, these counter-currents perform the highly useful function of creating lateral currents outside of outlet port 30 of chamber 28 which coact with circumscribing wall 32 to uniformly distribute floc formed in the mixing means 20 across the width of the floc accumulation region 38 of the surface 31 of the effluent contained in treatment tank 2. Such a width-wise uniform layer of floc is easily raked out of the tank 2 by the skimming paddles 89 of the skimming means 80 with a minimum of fluid agitation which can also cause the floc on the surface to become non-buoyant and sink to the bottom of the treatment tank 2.

Although the present invention has been described with reference to a preferred embodiment, it should be understood that the invention is not limited to the details thereof. A number of possible substitutions and modifications have been suggested in the foregoing detailed description, and others will occur to those of ordinary skill in the art. All such substitutions and modifications are intended to fall within the scope of the invention as defined in the appended claims.

What is claimed is:

1. An improved flotation apparatus for treating an effluent by forming a separable, buoyant floc from waste matter suspended in said effluent, comprising:
   (a) a treatment tank for containing the effluent being treated;
   (b) an inlet means for introducing a stream of effluent of cross-sectional area A into the tank;
   (c) conditioning agent supply means for supplying a stream of conditioning agent to said stream of effluent;
   (d) a bubble generator for introducing a stream of gas bubbles into said stream of effluent;
   (e) a mixing and floc dispersion means for admixing said stream of effluent, conditioning agent and bubbles and for dampening fluid currents generated by said effluent stream and for uniformly dispersing the buoyant floc formed in said chambers across the width of an area of the surface being treated in said tank, including:
      (i) a series of at least two elongated and fluidly connected chambers of increasing size, including first and second chambers;

(ii) an inlet port defined in the free end of the first chamber having a cross-sectional area greater than A for receiving said stream of effluent, conditioning agent and bubbles, and (iii) an outlet port defined in the free end of the last chamber in fluid communication with the effluent being treated in said tank.

2. An improved flotation apparatus for treating an effluent by forming a separable, buoyant floc from waste matter suspended in said effluent, comprising:

(a) a treatment tank for containing the effluent being treated;

(b) an inlet means for introducing a stream of effluent of cross-sectional area A into the tank;

(c) conditioning agent supply means for supplying a stream of conditioning agent to said stream of effluent;

(d) a bubble generator for introducing a stream of gas bubbles into said stream of effluent;

(e) a mixing and floc dispersion means for admixing said stream of effluent, conditioning agent and bubbles and for dampening fluid currents generated by said effluent stream and for uniformly dispersing the buoyant floc formed in said chambers across the width of an area of the surface being treated in said tank, including:

(i) a series of at least two elongated and fluidly connected chambers of increasing size, including first and second chambers having substantially constant cross-sectional area along their longitudinal axes of values X and Y, respectively, wherein Y is greater than X and X is greater than A;

(ii) an inlet port defined in the free end of the first chamber having a cross-sectional area greater than A for receiving said stream of effluent, conditioning agent and bubbles, and (iii) an outlet port defined in the free end of the last chamber in fluid communication with the effluent being treated in said tank.

3. The improved flotation apparatus defined in claim 2 wherein the inlet means is a conduit with a mouth of cross-sectional area A.

4. The improved flotation apparatus defined in claim 3 wherein said mouth is in alignment with said inlet port.

5. The improved flotation apparatus defined in claim 4 wherein said inlet port has a cross-sectional area equal to X.

6. The improved flotation apparatus defined in claim 5 wherein said inlet port is centered on the longitudinal axis of said first chamber.

7. The improved flotation apparatus defined in claim 6 wherein said mouth of said conduit is inserted into said inlet port and extends into said first chamber.

8. The improved flotation apparatus defined in claim 2 wherein the outlet port of said mixing and floc dispersion means is circumscribed by a wall which defines a progressively expanding cross-sectional area which assists said mixing means in uniformly dispersing said floc across said area.

9. The improved flotation apparatus defined in claim 8 wherein said mixing and floc dispersion means is submerged in the effluent being treated in said treatment tank.

10. The improved flotation apparatus defined in claim 9 wherein said mixing and floc dispersion means is vertically oriented in said treatment tank.

11. The improved flotation apparatus defined in claim 2 wherein said series of chambers become progressively longer along their longitudinal axes in the direction from the first chamber to the last chamber.

12. The improved flotation apparatus defined in claim 2 further including a third chamber having a cross-sectional area Z greater than that of the cross-sectional area Y of said second chamber.

13. The improved flotation apparatus defined in claim 12 wherein the outlet port of the last chamber of said floc mixing and dispersion means is circumscribed by a wall which defines a progressively expanding cross-sectional area which assists said mixing means in uniformly dispersing said floc across said area.

14. The improved flotation apparatus defined in claim 3 wherein said mouth of said conduit and said inlet port of said first chamber are submerged in the effluent being treated in said tank.

15. The improved flotation apparatus defined in claim 14 wherein said stream of gas bubbles communicates with the tank effluent surrounding the mouth of said conduit inlet means.

16. The improved flotation apparatus defined in claim 14 further including a bubble stream guide for guiding and concentrating the stream of gas bubbles generated by said bubble generator into the tank effluent surrounding the mouth of said conduit inlet means.

17. The improved flotation apparatus defined in claim 16 wherein said stream of flocculating agent is fluidly connected to said conduit inlet means.

18. The improved flotation apparatus defined in claim 16 wherein the cross-sectional area of the mouth of the conduit inlet means is about half as large as the cross-sectional area of the mouth of the inlet port of said mixing and floc dispersion means.

19. The improved flotation apparatus defined in claim 18 wherein said inlet port is defined in an end wall of said first chamber and wherein said wall functions to prevent non-buoyant floc produced in the mixing and floc dispersion means from sinking to the bottom of the tank.

20. An improved flotation process for treating a stream of effluent by forming a separable, buoyant floc from waste matter suspended in said effluent, comprising the steps of:

(a) introducing said stream of untreated effluent into a tank containing effluent being treated;

(b) supplying a stream of conditioning agent to said stream of effluent;

(c) supplying a stream of gas bubbles to said stream of effluent;

(d) admixing said streams of untreated effluent, conditioning agent and bubbles and reducing the turbulent currents generated by the introduction of said effluent stream into the tank and uniformly distributing the resulting buoyant floc across an area of the surface of the effluent in the tank by directing said streams into an inlet port defined in the free end of the first of a series of at least two elongated, fluidly connected chambers, wherein each of said chambers has a constant cross-sectional area but wherein the cross-sectional area of each subsequent chamber is larger than the one before it, and wherein the free end of the last of the series of chambers includes an outlet port in fluid communication with the effluent being treated in the tank.

21. The improved flotation process of claim 20 further including the step of passing the buoyant floc resulting from said admixing step out through a wall which circumscribes said outlet port, said wall defining a progressively expanding cross-sectional area in order to equalize the amount of floc dispersed over said area of said tank.

* * * * *